(12) United States Patent
Miura et al.

(10) Patent No.: US 8,097,553 B2
(45) Date of Patent: Jan. 17, 2012

(54) CATALYST SUPPORT POWDER AND EXHAUST GAS PURIFYING CATALYST

(75) Inventors: Masahide Miura, Susono (JP); Oji Kuno, Ann Arobor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 756 days.

(21) Appl. No.: 11/886,327

(22) PCT Filed: Mar. 20, 2006

(86) PCT No.: PCT/JP2006/306048
§ 371 (c)(1),
(2), (4) Date: Sep. 14, 2007

(87) PCT Pub. No.: WO2006/101216
PCT Pub. Date: Sep. 28, 2006

(65) Prior Publication Data
US 2009/0124491 A1    May 14, 2009

(30) Foreign Application Priority Data

Mar. 23, 2005 (JP) ................ 2005-084049

(51) Int. Cl.
*B01J 23/10* (2006.01)
*B01J 23/40* (2006.01)
*B01J 23/42* (2006.01)
*B01J 23/44* (2006.01)
*B01J 23/00* (2006.01)
*B01J 21/00* (2006.01)
*C01F 17/00* (2006.01)

(52) U.S. Cl. ........ 502/304; 502/326; 502/339; 502/349; 502/439; 423/263

(58) Field of Classification Search ............. 502/304, 502/326, 339, 349, 439; 423/263
See application file for complete search history.

(56) References Cited

U.S. PATENT DOCUMENTS

| 7,314,846 B2 * | 1/2008 | Kuno ............... 502/326 |
| 2003/0235526 A1 * | 12/2003 | Vanderspurt et al. ...... 423/263 |
| 2004/0087440 A1 | 5/2004 | Kuno |
| 2004/0171483 A1 | 9/2004 | Takeshima |
| 2004/0234439 A1 | 11/2004 | Takeshima et al. |

(Continued)

FOREIGN PATENT DOCUMENTS

EP   1 046 423 A2   10/2000

(Continued)

OTHER PUBLICATIONS

Mar. 17, 2011 European Office Action issued in European Application No. 06 729 996.6.

*Primary Examiner* — David M. Brunsman
*Assistant Examiner* — Kevin Johnson
(74) *Attorney, Agent, or Firm* — Oliff & Berridge, PLC

(57) ABSTRACT

The present invention provides a catalyst support powder 3 comprising ceria and zirconia, wherein the ratio of the molar fraction (mol %) of ceria on the support powder surface as measured by the X-ray photoelectron spectroscopy to the molar fraction (mol %) of ceria in the raw material is from 1.0 to 1.5. Further, the present invention provides an exhaust gas purifying catalyst 5 comprising the catalyst support powder 3 and platinum 4 supported thereon.

10 Claims, 3 Drawing Sheets

U.S. PATENT DOCUMENTS

| | | |
|---|---|---|
| 2007/0197373 A1 | 8/2007 | Miura et al. |
| 2007/0197379 A1 | 8/2007 | Miura |
| 2008/0051283 A1 | 2/2008 | Miura |

FOREIGN PATENT DOCUMENTS

| | | |
|---|---|---|
| EP | 1 415 956 A2 | 5/2004 |
| EP | 1 452 483 A1 | 9/2004 |
| EP | 1 479 651 A1 | 11/2004 |
| JP | A 06-279027 | 10/1994 |
| JP | A 10-194742 | 7/1998 |
| JP | A-2004-074138 | 3/2004 |
| JP | A 2004-141833 | 5/2004 |
| JP | A 2005-313024 | 11/2005 |
| JP | A 2005-313029 | 11/2005 |
| JP | A 2005-314133 | 11/2005 |
| JP | A 2005-314134 | 11/2005 |
| RU | 2 169 614 C1 | 6/2001 |
| RU | 2 262 983 C2 | 10/2005 |

* cited by examiner

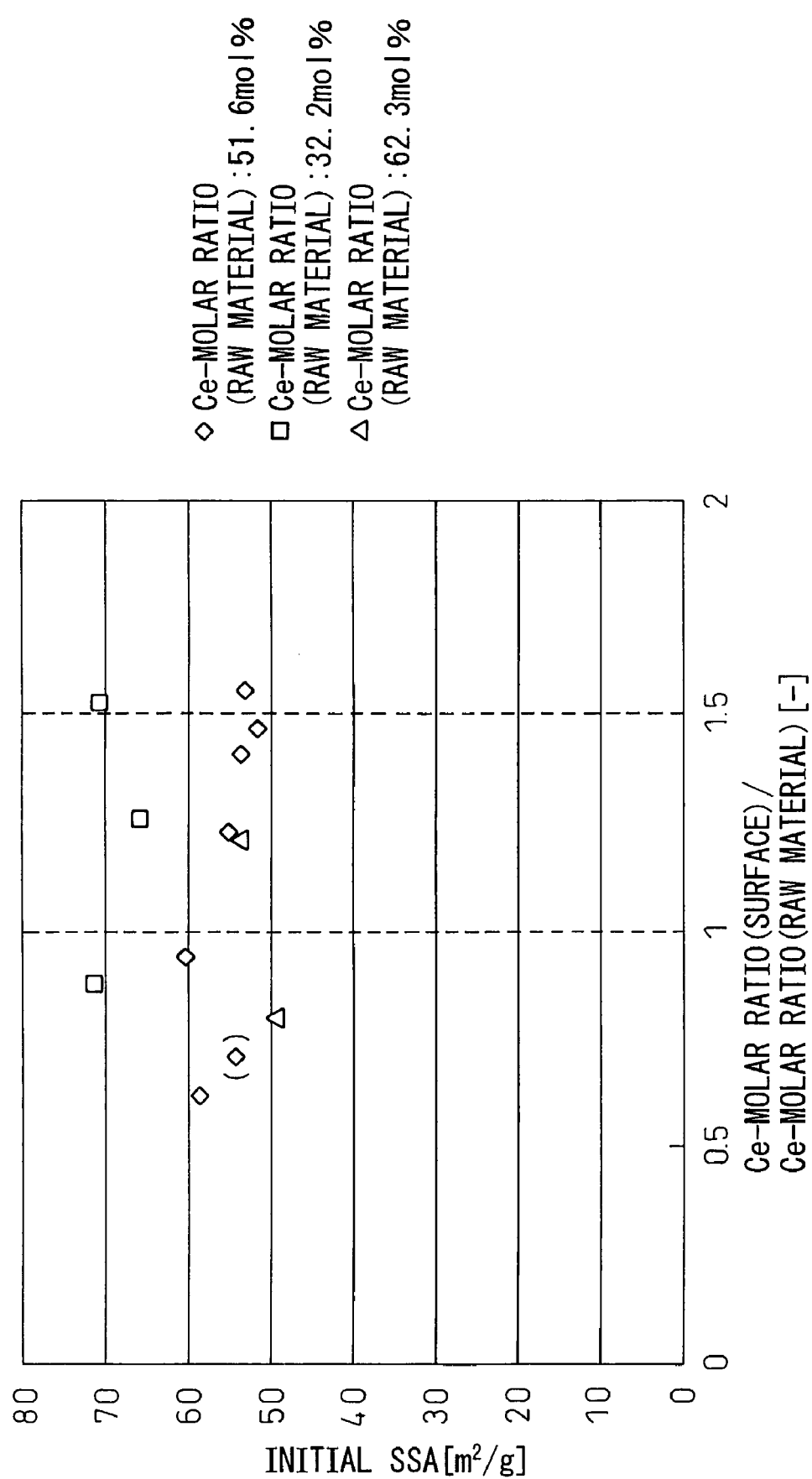

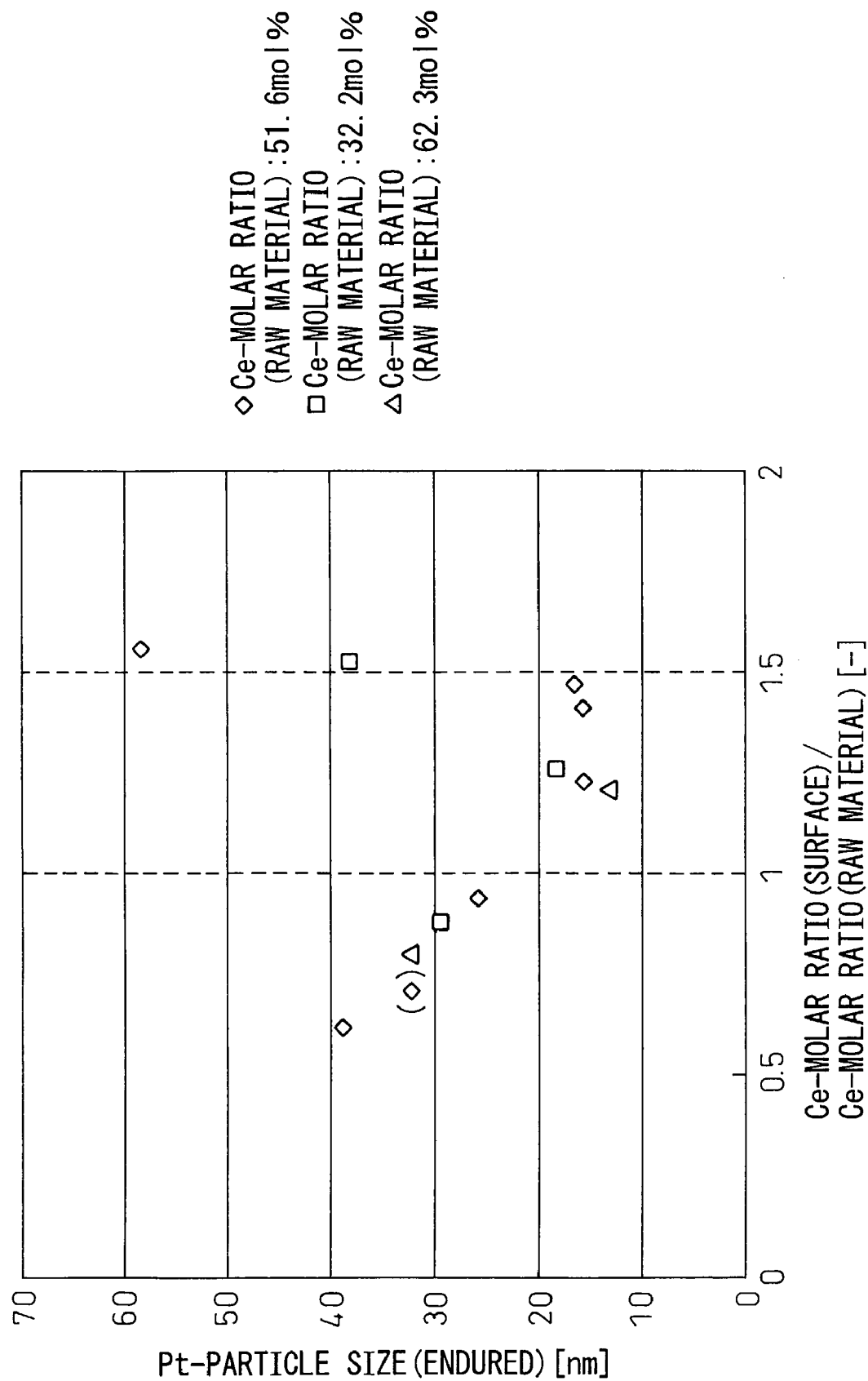

CATALYST SUPPORT POWDER AND EXHAUST GAS PURIFYING CATALYST

TECHNICAL FIELD

The present invention relates to a catalyst support powder and to an exhaust gas purifying catalyst produced from the catalyst support powder.

RELATED ART

The exhaust gas from internal combustion engines such as automobile engines contains nitrogen oxide ($NO_x$), carbon monoxide (CO), hydrocarbon (HC) and the like. These substances can be purified by using an exhaust gas purifying catalyst capable of oxidizing CO and HC and, at the same time, reducing $NO_x$. As for representative exhaust gas purifying catalysts, three-way catalysts where a noble metal such as platinum (Pt), rhodium (Rh) and palladium (Pd) is supported on a porous metal oxide support such as γ-alumina are known.

The metal oxide support may be formed of various materials but, in order to obtain a high surface area, alumina ($Al_2O_3$) has heretofore been generally used. However, in recent years, for accelerating the purification of the exhaust gas by using chemical properties of the support, it has been proposed to use various other materials such as ceria ($CeO_2$), zirconia ($ZrO_2$) and titanium ($TiO_2$) in combination with, or not in combination with, alumina.

For example, in order to alleviate the fluctuation of oxygen concentration in the exhaust gas and thereby increase the exhaust gas purifying ability of the three-way catalyst, a material having an oxygen storage capacity (OSC) of storing oxygen when the oxygen concentration in the exhaust gas is high, and releasing oxygen when the oxygen concentration in the exhaust gas is low, is used as a support for the exhaust gas purifying catalyst. A representative material having OSC is ceria.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric air-fuel ratio). Therefore, the fluctuation of oxygen concentration in the exhaust gas is preferably alleviated to maintain the oxygen concentration in the vicinity of the theoretical air-fuel ratio, so that the three-way catalyst can exert its exhaust gas purifying ability.

Furthermore, according to recent studies, it has been found that ceria not only has OSC but also, by virtue of its strong affinity for a noble metal, particularly platinum, can prevent particle growth (sintering) of the noble metal supported thereon.

In this way, ceria has preferred properties for use in an exhaust gas purifying catalyst but sometimes fails to provide the heat resistance required in such usage. Accordingly, a method for elevating the heat resistance of ceria by forming a solid solution of ceria and zirconia has been developed (see, for example, Japanese Unexamined Patent Publication (Kokai) Nos. 10-194742 and 6-279027).

The solid solution obtained by uniformly mixing ceria and zirconia is known to have good OSC and heat resistance. However, the composite metal oxide does not always allow ceria to satisfactorily show its property of preventing sintering of a noble metal such as platinum. This is because ceria and zirconia both are present on the surface of this composite metal oxide and therefore, a part of the noble metal is supported on the zirconia portion, rather than on the ceria portion, and cannot be protected from sintering in some cases.

In order to solve this problem, there has been proposed a technique of using a catalyst support having a core part containing zirconia in a larger amount than ceria and a surface layer containing ceria in a larger amount than zirconia, and loading platinum on this catalyst support, where by virtue of affinity between ceria and platinum, the sintering of platinum is prevented (see, Japanese Unexamined Patent Publication (Kokai) No. 2004-141833). According to the patent document, the exhaust gas purifying catalyst has such a structure, so that an excellent exhaust gas purifying performance can be provided even after endurance at a high temperature.

Japanese Unexamined Patent Publication Nos. 2005-313024, 2005-314133, 2005-314134 and 2005-313029, which were filed in the name of the present applicant or assignee and published prior to the international filing date of the present application but later than the priority date of the present application, also discloses catalyst supports having such a zirconia-rich core and ceria-rich surface layer structure.

More specifically, Japanese Unexamined Patent Publication No. 2005-313024 discloses an exhaust gas purifying catalyst for internal combustion engines, comprising a particulate support and a noble metal supported thereon. The particulate support comprises a core part relatively rich in zirconia ($ZrO_2$) and a surface layer relatively rich in ceria ($CeO_2$), and the content of $CeO_2$ in the particulate support is 40 to 65 mol % or less.

Japanese Unexamined Patent Publication No. 2005-314133 discloses a process for producing a metal oxide particle, e.g. having such a zirconia-rich shell and silica-rich surface layer structure. The process comprises providing a sol containing at least a population of first colloid particles (e.g. zirconia colloid particles) and a population of second colloid particles (e.g. ceria colloid particles) differing in the isoelectric point with each other; adjusting the pH of the sol to be closer to the isoelectric point of the population of first colloid particles than to the isoelectric point of the population of second colloid particles, thereby aggregating the population of first colloid particles; adjusting the pH of the sol, thereby aggregating the population of second colloid particles onto the population of first colloid particles aggregated; and drying and firing the obtained aggregate.

Japanese Unexamined Patent Publication No. 2005-314134 discloses a metal oxide particle comprising a core part relatively rich in a ceria-zirconia solid solution and a surface layer relatively rich in a second metal oxide such as ceria or zirconia.

Japanese Unexamined Patent Publication No. 2005-313029 discloses a metal oxide particle comprising a core part relatively rich in a first metal oxide such as zirconia and a surface layer relatively rich in a second metal oxide such as ceria. In the metal oxide particle, the core part and the surface layer each comprises a plurality of primary particles, and the primary particle diameter of the second metal oxide is smaller than the primary particle diameter of the first metal oxide, and thereby the particle surface is unfailingly covered with the second metal oxide.

DISCLOSURE OF THE INVENTION

The exhaust gas purifying catalyst having a zirconia-rich core and ceria-rich surface layer structure provides an excellent exhaust gas purifying performance even after an endurance test at a high temperature and successfully overcomes many conventional problems. An object of the present invention is to provide a more excellent exhaust gas purifying catalyst.

In the catalyst support powder comprising ceria and zirconia of the present invention, the ratio of the molar fraction (mol %) of ceria on the support powder surface as measured by the X-ray photoelectron spectroscopy to the molar fraction (mol %) of ceria in the raw material satisfies the following relationship:

{the molar fraction (mol %) of ceria on the support powder surface as measured by X-ray photoelectron spectroscopy}/ {the molar fraction (mol %) of ceria in the raw material}=1.0 to 1.5, particularly 1.2 to 1.5.

Also, in this catalyst support powder, the content of ceria based on the total ceria and zirconia may be from 30 to 65 mol %, particularly from 45 to 55 mol %. Incidentally, unless otherwise indicated, the molar fraction or content (mol %) as used herein is a molar fraction or content of a metal element.

According to the metal support powder of the present invention, when platinum is supported thereon, an exhaust gas purifying catalyst having unexpectedly excellent thermal endurance can be provided. This is considered to be because, in the catalyst support powder of the present invention, the ceria concentration on the support powder surface is made high so as to provide an effect of preventing sintering of platinum by making use of affinity between ceria and platinum and at the same time, an appropriate amount of zirconia is allowed to be present on the support powder surface so that the decrease of specific surface area due to sintering of the support powder itself can be suppressed.

Furthermore, according to the catalyst support powder of the present invention, the ceria concentration on the surface is appropriately controlled, so that even when the ceria concentration range is higher than that in the conventional composition (for example, $CeO_2:ZrO_2$ (by mol)=about 35:65), an exhaust gas purifying catalyst having unexpectedly excellent thermal endurance can be provided. According to the support powder containing ceria in such a relatively high concentration, for example, the oxygen storage capacity can be increased or the ceria concentration on the support powder surface can be elevated.

In addition, the catalyst support powder of the present invention may further comprise at least one oxide of the metal selected from the group consisting of an alkali metal, an alkaline earth metal and a rare earth, particularly yttrium oxide, for example, in a proportion of 0.1 to 10 mol %, particularly, from 3 to 9 mol %, based on ceria and zirconia.

According to this constitution, the heat resistance of the zirconia, ceria and/or ceria-zirconia solid solution can be enhanced.

The exhaust gas purifying catalyst of the present invention is obtained by loading platinum on the catalyst support powder of the present invention.

BRIEF DESCRIPTION OF THE DRAWINGS

FIG. 2 is a graph showing the relationship between the ratio of molar fraction of ceria on support powder surface to molar fraction of ceria in raw material (horizontal axis), and the initial specific surface area of support before an endurance test (vertical axis).

FIG. 3 is a graph showing the relationship between the ratio of molar fraction of ceria on support powder surface to molar fraction of ceria in raw material (horizontal axis), and the particle diameter of platinum after endurance (vertical axis).

BEST MODE FOR CARRYING OUT THE INVENTION

Figure 1:
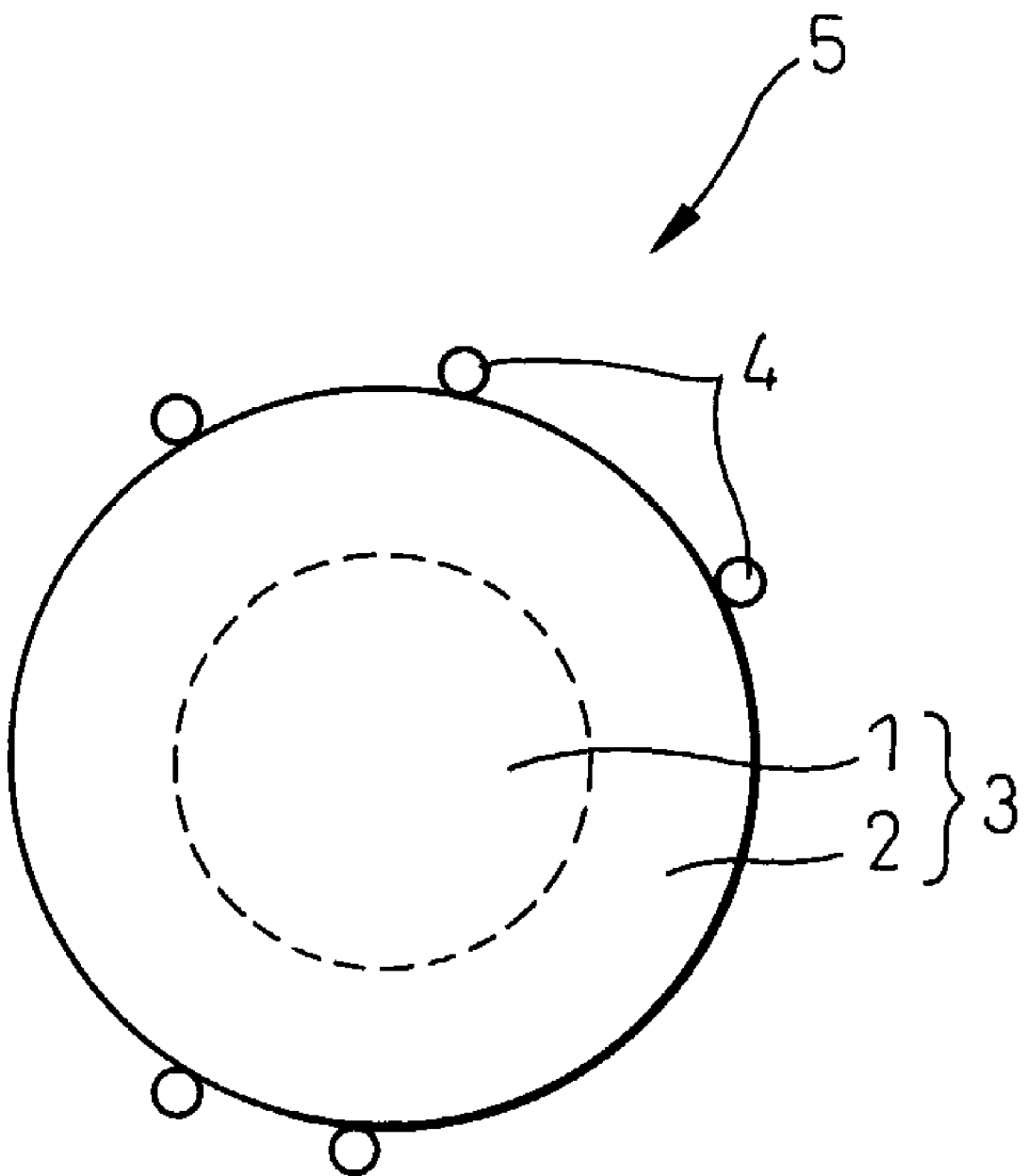
FIG. 1 is a cross-sectional view showing one embodiment of the catalyst of the present invention.

The catalyst support powder and exhaust gas purifying catalyst of the present invention are described by referring to FIG. 1. FIG. 1 is a cross-sectional schematic view of the exhaust gas purifying catalyst of the present invention.

As shown in FIG. 1, the exhaust gas purifying catalyst 5 of the present invention is obtained by loading a platinum particle 4 on the catalyst support powder 3 of the present invention. Also, the catalyst support powder 3 of the present invention comprises a core part 1 containing zirconia in a relatively large amount and a surface layer 2 containing ceria in a relatively large amount The catalyst support powder 3 may have an average particle diameter of, for example, less than 10 μm, less than 5 μm, less than 1 μm, less than 500 nm, less than 200 nm, less than 100 nm or less than 50 nm. The catalyst support powder 3 has a specific surface area of, for example, more than 50 $m^2/g$ before endurance.

The boundary between the core part 1 and the surface layer 2 need not be necessarily distinct, and may appear as a portion where the composition is gradually changed. Also, the catalyst support powder as a whole may be a ceria-zirconia solid solution. In FIG. 1, the surface layer 2 is shown as if it is continuous, but this part may be discontinuous.

In the case where the core part and the surface layer each comprises a plurality of primary particles and the catalyst support powder of the present invention is formed from a sol, the primary particle corresponds to the colloid particle in the sol and a distinct boundary may or may not be present between respective primary particles.

The catalyst support powder of the present invention may comprise an oxide of a metal other than cerium (Ce) and zirconium (Zr), for example, an oxide of a metal selected from the group consisting of an alkali metal, an alkaline earth metal and a rare earth, particularly, an oxide of yttrium (Y). In the catalyst support powder of the present invention, the total content of ceria and zirconia may be 80 mol % or more, particularly 85 mol % or more, more particularly 90 mol % of more.

The exhaust gas purifying catalyst of the present invention can be produced by loading platinum on the catalyst support powder of the present invention.

The noble metal may be loaded on the catalyst support powder by using any known method but, for example, a method of impregnating the catalyst support powder with a solution containing a salt and/or a complex salt of noble metal, and drying and then firing it may be employed. The amount of the noble metal supported on the catalyst support powder may be from 0.01 to 5 mass %, particularly from 0.1 to 2 mass %, based on the catalyst support powder.

The exhaust gas purifying catalyst of the present invention may be used not only by shaping the catalyst itself but also by coating it on a monolith support, for example, a ceramic-made honeycomb.

The catalyst support powder of the present invention may be produced by any method, but can be produced particularly by a process comprising the following steps:

(a) providing a sol containing at least a population of zirconia colloid particles and a population of ceria colloid particles differing in the isoelectric point with each other, (b) adjusting the pH of the sol to be closer to the isoelectric point of the population of zirconia colloid particles than to the isoelectric point of the population of ceria colloid particles, particularly into the range of ±1.0, more particularly ±0.5, of the isoelectric point of the population of zirconia colloid particles, thereby aggregating the population of zirconia colloid particles, (c) adjusting the pH of the sol to be closer to the isoelectric point of the population of ceria colloid particles, particularly into the range of ±1.0, more particularly ±0.5, of the isoelectric point of the population of ceria colloid particles, thereby aggregating the population of ceria colloid particles in the periphery of the population of zirconia colloid particles aggregated, and (d) drying and firing the obtained aggregate.

In this production process for the catalyst support powder, the pH and temperature of the sol in the steps (b) and/or (c), the drying rate in the step (d), etc. are controlled so as to give a predetermined ratio of molar fraction (mol %) of ceria on the support powder surface as measured by XPS to the molar fraction (mol %) of ceria in the raw material.

Respective steps in this process are described below.

<Provision of Sol>

In this process, a sol comprising at least a population of zirconia colloid particles and a population of ceria colloid particles differing in the isoelectric point is firstly provided.

The term "colloid particles" as used herein means a particles which comprise a metal oxide or a metal bonded to oxygen dispersed in a liquid, particularly water, and which produces a metal oxide when the dispersion medium is removed and the residue is fired. The "colloid particles" are generally understood to have a diameter of 1 to 1,000 nm, particularly from 1 to 500 nm. For example, a colloid particle having a diameter of less than 100 nm or less than 50 nm is available.

The term "sol" as used herein means a dispersion system where colloid particles are dispersed in a dispersion medium which is a liquid, and this is sometimes referred to as a colloid solution. The dispersion medium contained in the sol is generally water, but an organic dispersion medium such as alcohol and acetylacetone may be contained, if desired.

Specific examples of the sol include substances obtained by hydrolyzing and condensing an alkoxide, an acetylacetonate, an acetate or a nitrate of metal. In addition, the zirconia sol and the ceria sol are known materials, and may also be available as commercial products.

The metal oxide sol generally available on the market has a pH different from the isoelectric point of the colloid particles contained therein, so that the colloid particles contained can electrostatically repel each other to prevent aggregation. That is, a sol containing colloid particles having an isoelectric point on the alkali side is stabilized by acidifying the sol (acid-stabilized sol), and a sol containing colloid particles having an isoelectric point on the acidic side is stabilized by alkalifying the sol (alkali-stabilized sol).

The isoelectric point of the colloid particles does not necessarily depend on a material itself constituting the particles, such as oxide, but can be arbitrarily set by the surface modification of colloid particles, particularly by the surface modification of colloid particles with an organic compound. Accordingly, a population of ceria or zirconia colloid particles used in the process of the present invention may be selected to have an appropriate pH for the present invention. For example, the populations of colloid particles can be selected to give a difference of at least 3 or more, particularly 4 or more, more particularly 5 or more, between the isoelectric points of the both populations of colloid particles.

The isoelectric point of a population of colloid particles, which must be known for the process, may be determined by any method. The isoelectric point can be measured, for example, by an electrophoretic light scattering method.

The sol containing at least two populations of colloid particles, which can be used in the process of the present invention, may be obtained by any method but, in particular, the sol can be obtained by mixing different sols. The mixing ratio of these populations of colloid particles can be determined depending on the desired properties of the metal oxide particle.

In the process, an element such as an alkaline metal, an alkaline earth and a rare earth, which are preferably contained in the catalyst support powder, can be contained in the sol not only as colloid particles but also as a metal salt such as a nitrate.

<Aggregation of Zirconia>

In the process, the pH of the sol is then adjusted to be closer to the isoelectric point of the population of zirconia colloid particles than to the isoelectric point of the population of ceria colloid particles, thereby aggregating the population of zirconia colloid particles.

As described above, the sol generally available on the market has a pH different from the isoelectric point of colloid particles contained therein, so that the colloid particles can have a large positive or negative electric charge to prevent precipitation by electrostatic effect. Accordingly, when the pH of a sol containing a population of zirconia colloid particles and a population of ceria colloid particles is changed to the vicinity of the isoelectric point of the population of zirconia colloid particles, the zeta potential of the population of zirconia colloid particles becomes small, and this allows for little generation of electrical repulsion between particles, whereby aggregation of the population of zirconia colloid particles is accelerated. At this stage, the pH of the sol is relatively different from the isoelectric point of the population of ceria colloid particles and, therefore, the population of ceria colloid particles has a relatively large zeta potential and is prevented from aggregation.

Incidentally, in aggregating the colloid particles, if the pH of the sol is changed to pass though the isoelectric point of the colloid particles intended to be aggregated, the zeta potential of the colloid particles becomes zero when the pH of the sol passes through the isoelectric point thereof, so that aggregation of the colloid particles can be unfailingly attained.

The pH of the sol can be adjusted by adding any acid or alkali. Examples of the acid which can be used include mineral acids such as nitric acid and hydrochloric acid, and examples of the alkali which can be used include aqueous ammonia and sodium hydroxide. The pH of the sol can also be adjusted by merely mixing multiple species of sols.

The pH of the sol can be adjusted by a method of adding an acid or an alkali to the sol while measuring the pH of the sol by a pH meter, or a method of predetermining the amount of acid or alkali necessary for the pH adjustment by using a previously sampled sol, and adding an acid or alkali to the entire sol in the predetermined amount.

<Aggregation of Ceria Colloid Particles>

In the process, the pH of the sol is then adjusted to be closer to the isoelectric point of the population of ceria colloid particles than to the isoelectric point of the population of zirconia colloid particles, thereby aggregating the population of ceria colloid particles onto the periphery of the population of zirconia colloid particles aggregated.

When the pH of the sol containing the population of zirconia colloid particles aggregated is changed to the vicinity of the isoelectric point of the population of ceria colloid particles, the zeta potential of the population of ceria colloid particles becomes small and this allows for less generation of electrical repulsion between the ceria colloid particles, whereby aggregation of the population of ceria colloid particles is accelerated. At this stage, the pH of the sol is relatively distant from the isoelectric point of the population of zirconia colloid particles, so that the population of zirconia colloid particles can be prevented from aggregation and the population of ceria colloid particles can deposit onto the periphery of the population of zirconia colloid particles aggregated.

The pH of the sol can be adjusted in the same manner as in the above-described aggregation of the zirconia colloid particles.

<Drying and Firing of Aggregate>

The thus-obtained aggregate is dried and fired, whereby a catalyst support powder of the present invention is obtained.

The removal and drying of a dispersion medium from a sol may be performed by any method at any temperature. For example, this can be achieved by placing the sol in an oven at 120° C. The material obtained by removing and drying the dispersion medium from the sol is fired, whereby the catalyst support powder can be obtained. The firing may be performed at a temperature generally employed for producing metal oxides, for example at a temperature of 500 to 1,100° C.

The present invention is described in greater detail below by referring to Examples, but the present invention is not limited thereto.

EXAMPLES

In the following tests, the pH of the sol was measured by using a pH meter wherein the pH meter electrode was directly dipped in the sol.

Example 1

A platinum-supporting ceria ($CeO_2$)-zirconia ($ZrO_2$)-yttria ($Y_2O_3$) composite oxide catalyst having the following properties was provided.
Compositional ratio: $CeO_2:ZrO_2:Y_2O_3$=60:36:4 (by weight)
Molar fraction of ceria on surface: 63.7 mol %
Initial specific surface area: 55.1 $m^2/g$ This catalyst was produced by the following process.

An aqueous alkali-stabilized zirconia sol solution, an acid-stabilized ceria sol solution and an aqueous yttria solution each in a predetermined amount were mixed to obtain an acidic mixed sol and thereby zirconia colloid particles were aggregated. Subsequently, an aqueous ammonia ($NH_3$) was added until the pH reached 10, thereby ceria colloid particles were aggregated on the aggregated zirconia particles. The resulting solution was dried at 120° C. for 24 hours, and the dried product was fired at 700° C. for 5 hours.

The thus-obtained oxide powder was dispersed in distilled water which was in an amount of 6-fold mass, a 4.4 mass % dinitrodiammine platinum solution was added thereto to give a platinum content of 1.0 mass % based on the oxide powder, and the resulting solution was stirred for 1 hour. Furthermore, the water content was removed by drying at 120° C., and the residue was dried at 500° C. for 2 hours.

Examples 2 and 3 and Comparative Examples 1 to 3

Based on the production process of Example 1, catalyst support powders of Examples 2 and 3 and Comparative Examples 1 to 3 were obtained by changing the manner of adjusting the pH of the sol. On each of the thus-obtained support powders, platinum was loaded in the same manner as in Example 1. The compositional ratio of each support powder in these Examples and Comparative Examples was the same as that in Example 1. The molar fraction of ceria on surface, the molar fraction of ceria in raw material, and the initial specific surface area are shown in Table 2.

Comparative Example 4

A catalyst was produced by a conventional coprecipitation process shown below.

Cerium ammonium nitrate II, zirconium oxynitrate and yttrium nitrate each in a predetermined amount were added to distilled water and dissolved by stirring. To this solution, an aqueous ammonia was added until the pH reached 9, and precipitation was caused by coprecipitation process. The resulting solution was dried at 120° C. for 24 hours, and the dried product was fired at 700° C. for 5 hours. On the thus-obtained oxide powder, platinum was loaded in the same manner as in Example 1.

The molar fraction of ceria on the surface, the molar fraction of ceria in the raw material, and the initial specific surface area are shown in Table 2. As shown in Table 1, in the case of a catalyst support powder obtained by the conventional coprecipitation process, the ratio of surface Ce concentration/raw material Ce concentration is smaller than 1.0, and the ratio was about 0.7.

Example 4 and Comparative Examples 5 and 6

Based on the production process of Example 1, catalyst support powders of Example 4 and Comparative Examples 5 and 6 were obtained by changing the manner of adjusting the pH of the sol. However, here, the compositional ratio of the support powder was made to be $CeO_2:ZrO_2:Y_2O_3$=40:56:4 (by weight) by changing the compositional ratio of raw materials. On each of the thus-obtained support powders, platinum was loaded in the same manner as in Example 1. The molar fraction of ceria on surface, the molar fraction of ceria in raw material, and the initial specific surface area are shown in Table 2.

Example 5 and Comparative Example 7

Based on the production process of Example 1, catalyst support powders of Example 5 and Comparative Example 7 were obtained by changing the manner of adjusting the pH of the sol. However, here, the compositional ratio of the support powder was made to be $CeO_2:ZrO_2:Y_2O_3$=70:26:4 (by weight) by changing the compositional ratio of raw materials. On each of the thus-obtained support powders, platinum was loaded in the same manner as in Example 1. The molar fraction of ceria on surface, the molar fraction of ceria in raw material, and the initial specific surface area are shown in Table 2.

<Evaluation>

<Initial Specific Surface Area (SSA) before Endurance Test>

This was measured by using a BET one-point method based on nitrogen adsorption.

<Measurement of Molar Fraction of Ceria on Metal Oxide Particle Surface before Endurance Test>

This was measured by an X-ray photoelectron spectroscopy (XPS), and PHI-5800 manufactured by ULVAC-PHI, Inc. was used here.

<Endurance>

This test was performed at 1,000° C. for 5 hours by switching over a rich gas and a lean gas shown in Table 1 every one minute.

TABLE 1

| | Gas Composition | | | | | | | |
|---|---|---|---|---|---|---|---|---|
| | $N_2$ (%) | $CO_2$ (%) | NO (ppm) | CO (%) | $C_3H_6$ (ppmC) | $H_2$ (%) | $O_2$ (%) | $H_2O$ (%) |
| Rich Gas | balance | 10 | 2200 | 2.80 | 2500 | 0.27 | 0.77 | 10 |
| Lean Gas | balance | 10 | 2200 | 0.81 | 2500 | 0 | 1.7 | 10 |

<Particle Diameter of Platinum after Endurance Test>

This was measured by a carbon monoxide pulse adsorption method at −80° C.

For the evaluation of catalytic activity, the platinum-supporting catalyst was used after shaping it into a 1 mm-square pellet.

The evaluation results are shown in Table 2 below. The initial specific surface area before endurance and the particle diameter of platinum after endurance are shown also in FIGS. 2 and 3. In each of FIGS. 2 and 3, the result of the catalyst of Comparative Example 4 using a coprecipitation process is parenthesized.

TABLE 2

| | Initial SSA and Particle Diameter of Pt after Endurance Test | | | | | |
|---|---|---|---|---|---|---|
| | Composition Charged (weight ratio) ($CeO_2$:$ZrO_2$:$Y_2O_3$) | (1) Molar Fraction of Ce in Raw Material [Ce/(Ce + Zr)] (mol %) | (2) Molar Fraction of Ce on Surface [Ce/(Ce + Zr)] (mol %) | (2)/(1) (—) | SSA of Support ($m^2$/g) | Particle Diameter of Pt (nm) |
| Ex. 1 | 60:36:4 | 51.6 | 63.7 | 1.23 | 55.1 | 15.6 |
| Ex. 2 | 60:36:4 | 51.6 | 72.9 | 1.41 | 53.7 | 15.6 |
| Ex. 3 | 60:36:4 | 51.6 | 75.8 | 1.47 | 51.7 | 16.5 |
| Ex. 4 | 40:56:4 | 32.2 | 40.6 | 1.26 | 65.9 | 18.3 |
| Ex. 5 | 70:26:4 | 62.3 | 75.3 | 1.21 | 53.9 | 13.2 |
| Comp. Ex. 1 | 60:36:4 | 51.6 | 32.0 | 0.62 | 58.7 | 38.9 |
| Comp. Ex. 2 | 60:36:4 | 51.6 | 48.4 | 0.94 | 54.3 | 25.9 |
| Comp. Ex. 3 | 60:36:4 | 51.6 | 80.5 | 1.56 | 53.2 | 58.3 |
| Comp. Ex. 4 | 60:36:4 | 51.6 | 36.8 | 0.71 | 60.3 | 32.3 |
| Comp. Ex. 5 | 40:56:4 | 32.2 | 28.3 | 0.88 | 71.3 | 29.5 |
| Comp. Ex. 6 | 40:56:4 | 32.2 | 49.3 | 1.53 | 70.6 | 38.2 |
| Comp. Ex. 7 | 70:26:4 | 62.3 | 50.1 | 0.80 | 49.6 | 32.5 |

As can be seen from Table 2 and FIG. 2, the initial specific surface area of each support of Examples 1 to 5 and Comparative Examples 1 to 7 is dependent on the ceria concentration in the raw material, and is not correlated with the ratio of the molar fraction (mol %) of ceria on the support powder surface to the molar fraction (mol %) of ceria in the raw material. Nevertheless, as shown in Table 2 and FIG. 3, in the catalysts of Examples 1 to 5 using a catalyst support powder prepared such that this ratio was in the range from 1.0 to 1.5, the particle diameter of platinum after endurance is small in comparison with the catalysts of Comparative Examples 1 to 7 where this ratio was out of the range from 1.0 to 1.5.

In other words, it is considered that, as compared with the catalysts of Comparative Examples, in the catalysts of Examples the effect of preventing sintering of platinum by virtue of affinity between ceria and platinum and the effect of preventing sintering of the support itself by virtue of the zirconia component of the support are provided in a good combination and, as a result, small diameter particles of platinum are maintained even after the endurance test.

The invention claimed is:

1. A catalyst support powder comprising ceria and zirconia, wherein a ratio of the molar fraction (mol %) of ceria on the support powder surface as measured by X-ray photoelectron spectroscopy to a molar fraction (mol %) of ceria in a raw material utilized to form the support powder satisfies the following relationship:

{the molar fraction (mol %) of ceria on the support powder surface as measured by X-ray photoelectron spectroscopy}/{the molar fraction (mol %) of ceria in the raw material}=1.2 to 1.5 wherein the content of ceria based on a total content of ceria and zirconia is more than 35 to 65 mol %.

2. The catalyst support powder according to claim 1, wherein the content of ceria based on the total content of ceria and zirconia is from 45 to 55 mol %.

3. The catalyst support powder according to claim 1, wherein the total content of ceria and zirconia is 80 mol % or more.

4. The catalyst support powder according to claim 1, wherein the catalyst support powder further comprises at least one oxide of metal selected from an alkali metal, an alkaline earth metal and a rare earth.

5. The catalyst support powder according to claim 1, wherein the catalyst support powder has a specific surface area of more than 50 $m^2$/g before endurance.

6. The catalyst support powder according to claim 1, wherein the catalyst support powder comprises a core part, a surface layer, and a transition portion between the core part and the surface layer wherein a composition of the support powder gradually changes from the surface layer to the core part.

7. An exhaust gas purifying catalyst comprising the catalyst support powder according to claim 1 and platinum supported on the catalyst support powder.

8. The exhaust gas purifying catalyst according to claim 7, wherein the amount of platinum supported on the catalyst support powder is from 0.01 to 5 mass %, based on catalyst support powder.

9. The catalyst support powder according to claim 1, wherein the content of ceria based on the total of ceria and zirconia is from more than 50 to 65 mol %.

10. The catalyst support powder according to claim 1, wherein the content of ceria based on the total of ceria and zirconia is from 51.6 to 65 mol %.

* * * * *